United States Patent
Rao et al.

(10) Patent No.: US 6,784,791 B2
(45) Date of Patent: Aug. 31, 2004

(54) POTENTIAL COLLISION DETECTION AND PARKING AID SYSTEM

(75) Inventors: Manoharprasad K. Rao, Novi, MI (US); Kwaku O. Prakah-Asante, Commerce Township, MI (US); Gary Steven Strumolo, Beverly Hills, MI (US); Robert Kwiecinski, Saline, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 10/064,550

(22) Filed: Jul. 25, 2002

(65) Prior Publication Data

US 2004/0017287 A1 Jan. 29, 2004

(51) Int. Cl.[7] .................................. B60Q 1/00
(52) U.S. Cl. ................ 340/435; 340/436; 340/441; 701/301
(58) Field of Search ............................. 340/435, 436, 340/438, 441, 933, 935, 936, 938; 701/301

(56) References Cited

U.S. PATENT DOCUMENTS

| | | | | |
|---|---|---|---|---|
| 5,572,484 A | * | 11/1996 | Gaus et al. ................... 367/99 |
| 5,754,123 A | * | 5/1998 | Nashif et al. ................ 340/903 |
| 6,072,391 A | * | 6/2000 | Suzuki et al. ................ 340/468 |
| 6,097,314 A | * | 8/2000 | Desens et al. ............ 340/932.2 |
| 6,281,786 B1 | * | 8/2001 | Adachi et al. ............... 340/435 |
| 6,326,887 B1 | * | 12/2001 | Winner et al. ............... 340/435 |
| 6,583,753 B1 | * | 6/2003 | Reed ............................ 342/70 |
| 6,594,614 B2 | * | 7/2003 | Studt et al. .................. 702/150 |

FOREIGN PATENT DOCUMENTS

DE          10142170 A1 *   3/2003    ........... G01S/13/12

\* cited by examiner

*Primary Examiner*—Toan N. Pham
(74) *Attorney, Agent, or Firm*—Frank A. MacKenzie

(57) ABSTRACT

A collision warning and countermeasure system (10) for an automotive vehicle (12) is provided. The system (10) includes a velocity sensor (18) that generates a vehicle velocity signal. A multi-mode object detection sensor (28) generates an object detection signal. The multi-mode object detection sensor (28) operates in a detection mode in response to the vehicle velocity signal. A controller (26) is electrically coupled to the velocity sensor (18) and the multi-mode object detection sensor (28) and generates a countermeasure signal in response to the object detection signal. A method of performing the same is also provided.

20 Claims, 2 Drawing Sheets

POTENTIAL COLLISION DETECTION AND PARKING AID SYSTEM

CROSS REFERENCE TO RELATED APPLICATIONS

The present invention is related to U.S. patent application Ser. No. 10/064,552 entitled "Potential Collision Detection and Reversing Aid System" filed simultaneously herewith and incorporated by reference herein.

BACKGROUND OF INVENTION

1. Technical Field

The present invention relates to collision warning and countermeasure systems and parking aid systems for an automotive vehicle, and more particularly to a system and method of performing object detection for the stated systems.

2. Background of the Invention

Collision warning and countermeasure systems, and parking aid systems are becoming more widely used. Collision warning and countermeasure systems and parking aid systems provide a vehicle operator knowledge and awareness of objects vehicles within close proximity so as to prevent colliding with those objects. Countermeasure systems exist in various passive and active forms. Some countermeasure systems are used to aid in prevention of a collision, others are used to aid in the prevention of injury to a vehicle operator.

Collision warning and countermeasure systems currently exist in various forms. Certain collision warning and countermeasure systems are able to sense a vehicle or an object at approximate distances of 20–30 m from a host vehicle and warn the host vehicle operator, such that the operator can take precautionary steps to prevent a collision or injury. Other collision warning and countermeasure systems activate passive or active countermeasures such as airbags, load limiting seatbelts, or brake control whereby the system itself aids in preventing a collision or injury.

Parking aid systems are typically used to detect an object forward and rearward of the host vehicle. When the host vehicle is traveling in a forward direction at relatively slow velocities of approximately less than 10 kph, the parking aid system detects objects approximately within 60 cm forward of the host vehicle. When the vehicle is in reverse gear, such that the vehicle is traveling in a rearward direction the parking aid system is detecting objects within approximately 180 cm of the host vehicle. Parking aid systems indicate to a vehicle operator that an object, that may not be visible to the vehicle operator, is within the stated distances of the vehicle. The vehicle operator may then respond accordingly.

Currently, since most of the object detection sensors are only capable of operating in a single mode, in order to perform object detection for both collision warning and countermeasure systems and for parking aid systems, dual sets of object detection sensors are required. A first set of object detection sensors operate in a first mode to detect objects in a first range and a second set of object detection sensors operate in a second mode to detect objects in a second range. Object detection sensing requirements are generally less stringent for objects existing at 20–30 m than for objects existing within parking aid system object detection ranges.

It is desirable, when designing a vehicle to minimize vehicle components, so as to minimize space requirements for the components in a vehicle, minimize weight of the vehicle, and minimize vehicle production and manufacturing costs. It is therefore desirable to provide a collision warning and countermeasure system that incorporates features of a parking aid system and minimizes the amount of object detection sensors to satisfy the above-stated desirable design objectives.

SUMMARY OF INVENTION

The present invention provides a system and method of detecting objects within a close proximity of an automotive vehicle. A collision and countermeasure system for an automotive vehicle is provided. The system includes a velocity sensor that generates a vehicle velocity signal. A multi-mode object detection sensor generates object detection signal. The multi-mode object detection sensor operates in a detection mode in response to the vehicle velocity signal. A controller is electrically coupled to the velocity sensor and the multi-mode object detection sensor and generates a countermeasure signal in response to the object detection signal. A method of performing the same is also provided.

One of several advantages of the present invention is that it provides a collision warning, countermeasure, and parking aid system that utilizes multi-mode object detection sensors, thereby, utilizing the same object detection sensors for both potential collision detection and parking aid. The ability to use the same objet detection sensors for multiple operating modes reduces the number of vehicle components, weight of the vehicle, and production and manufacturing costs and increases space available in the vehicle.

Another advantage of the present invention is that it is versatile. It may be applied in multiple applications due to the ability of operating in multiple modes and in various combinations. For example, a first multi-mode object detection sensor may be utilized for more than one operating mode and a second multi-mode object detection sensor may be utilized synchronously with, but for a different operating mode than the first multi-mode object detection sensor.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

Figure 1:
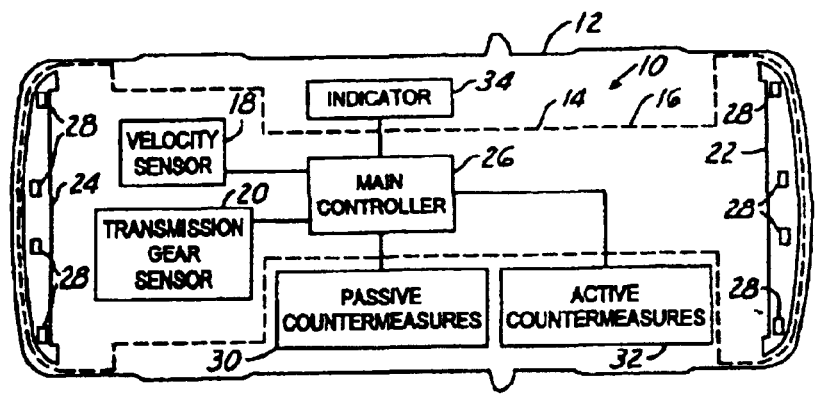
FIG. 1 is a block diagrammatic view of a collision warning and countermeasure system for an automotive vehicle in accordance with an embodiment of the present invention.

In the following figures the same reference numerals will be used to refer to the same components. While the present invention is described with respect to a system and method of detecting objects exterior to an automotive vehicle, the present invention may be adapted and applied to various systems including: collision warning systems, collision avoidance systems, parking aid systems, reversing aid systems, countermeasure systems, vehicle systems, or other systems that may require collision avoidance or assessment.

In the following description, various operating parameters and components are described for one constructed embodiment. These specific parameters and components are included as examples and are not meant to be limiting.

Also, in the following description the term "performing" may include activating, deploying, initiating, powering, and other terms known in the art that may describe the manner in which a passive countermeasure may be operated.

Additionally, in the following description various countermeasures are discussed. The countermeasures may be reversible or irreversible. Reversible countermeasures refer to countermeasures that may be reset to their original form or used repeatedly without a significant amount of functional deficiency, which may be determined by a system designer. Irreversible countermeasures refer to countermeasures such as airbags that, once deployed, are not reusable.

Moreover a countermeasure signal may include information pertaining to the above stated reversible and irreversible countermeasures or may include other information, such as collision warning information, default mode countermeasure information, and parking aid countermeasure information. For example, the countermeasure signal may contain object detection information, which may be used to indicate to a vehicle operator the presence or close proximity of a detected object.

Referring now to FIG. 1, a block diagrammatic view of a collision warning and countermeasure system 10 for an automotive vehicle or host vehicle 12 in accordance with an embodiment of the present invention is shown. The system 10 includes a potential collision detection and parking aid system 14 and a potential collision detection and reversing aid system 16. The systems 10, 14, and 16 include a velocity sensor 18, a transmission gear sensor 20, a forward series of multi-mode object detection sensors 22, and a rearward series of multi-mode object detection sensors 24, which are electrically coupled to a main controller 26. The forward detection sensors 22 and the rearward detection sensors 24 may each include one or more multi-mode object detection sensors 28 as shown. The controller 26 is also electrically coupled to passive countermeasures 30, active countermeasures 32, and an indicator 34. The controller 26 determines operating modes of the forward detection sensors 22 and of the rearward detection sensors 24 and whether to activate the passive countermeasures 30, the active countermeasures 32, or determines whether to indicate, via the indicator 34, to a vehicle operator various object and vehicle status information.

The velocity sensor 18 may be of various forms, such as a transmission rotation sensor, a wheel speed sensor, an accelerometer, an optical sensor, or other velocity sensor known in the art. The velocity sensor 18 determines the traveling speed of the vehicle 12 and generates a velocity signal.

The gear sensor 20 may also be of various forms. The gear sensor 20 may be in the form of a switch, a solenoid, a motion sensor, an encoder, or in another form known in the art. The gear sensor 20 determines the operating gear of the vehicle 12 and generates a gear signal. Note the gear sensor 20 may detect an operating gear of a conventional mechanical transmission or may correspond to an operating range of an electronic transmission.

The forward detection sensors 22 and the rearward detection sensors 24 are capable of operating in multiple modes. The forward detection sensors 22 and the rearward detection sensors 24 may be of various sensor technologies including: radar, lidar, or other sensor technology form known in the art. The forward detection sensors 22 and the rearward detection sensors 24 generate multiple object detection signals upon detecting one or more objects of various size and shape. The object detection signals may include various object information including object relative range, velocity, and bearing information, as well as other object information known in the art.

Figure 2:
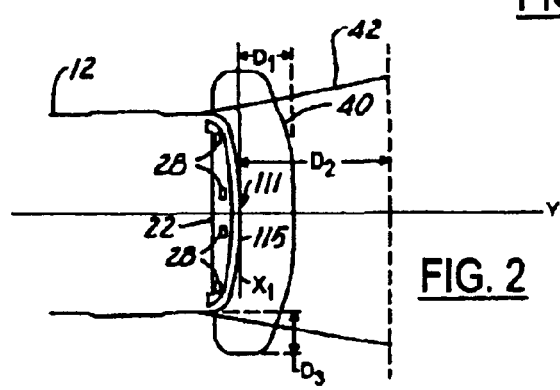
FIG. 2 is a top view of forward sensing zones for a parking aid mode and a default mode in accordance with an embodiment of the present invention.

Referring now also to FIG. 2, a top view of forward sensing zones for a parking aid mode and a default mode in accordance with an embodiment of the present invention are shown.

In one embodiment of the present invention, the forward detection sensors 22 are capable of operating in a forward parking aid mode or in a default mode. The forward parking aid mode, for the forward detection sensors 22, refers to monitoring a first forward sensing zone 40 having a sensing distance $D_1$ of approximately up to five meters. In another embodiment of the present invention, the sensing distance $D_1$ is approximately equal to 60 cm. The default mode, for the forward detection sensors 22, refers to monitoring a second forward sensing zone 42 having a sensing distance $D_2$ of approximately equal to 5–30 m. In another embodiment of the present invention the sensing zone $D_2$ is approximately between 20–30 m. During the forward parking aid mode the forward detection sensors 22 detect an object within forward sensing zone 40 that may have a lateral sensing distance $D_3$ that is approximately equal to 50 cm.

Figure 3:
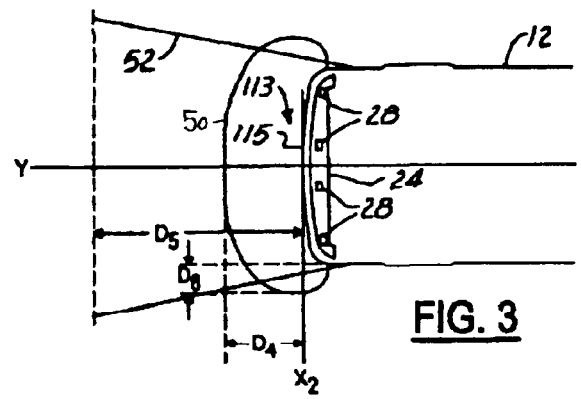
FIG. 3 is a top view of rearward sensing zones for the parking aid mode, a reversing aid mode, and the default mode in accordance with an embodiment of the present invention.

Referring now also to FIG. 3, a top view of rearward sensing zones for the parking aid mode, a reversing aid mode, and the default mode in accordance with an embodiment of the present invention are shown.

In one embodiment of the present invention, the rearward detection sensors 24 are capable of operating in a reverse parking aid mode or reversing aid mode and the default mode. The reversing aid mode, for the rearward detection sensors 24 refers to monitoring a first rearward sensing zone 50 having a sensing distance $D_4$ approximately equal to 5 m. In another embodiment of the present invention, the sensing distance $D_4$ is approximately equal to 180 cm. The default mode, for the rearward detection sensors 24, refers to monitoring a second rearward sensing zone 52 having a sensing distance $D_5$ approximately equal to 5–30 m. In another embodiment of the present invention the sensing distance $D_5$ is approximately between 20–30 m. During the reversing aid mode the rearward detection sensors 24 detect an object within rearward sensing zone 50 that may have a lateral sensing distance $D_6$ approximately equal to 50 cm.

The main controller 26 is preferably microprocessor based such as a computer having a central processing unit, memory (RAM and/or ROM), and associated input and output buses. The main controller 26 may be a portion of a central vehicle main control unit, an interactive vehicle dynamics module, a restraints control module, a main safety controller, or may be a stand-alone controller as shown. The controller 26 determines which of the detection sensors 22 and 24 operate in the parking aid the reversing aid mode, the default mode, or other modes known in the art. The parking aid mode includes the forward parking aid mode and the reverse parking aid mode.

While operating in the default mode the controller 26 may provide collision warning and countermeasure performance. Depending upon vehicle 12 and object relative positions, velocities, and accelerations, the controller 26 may determine whether to indicate to the vehicle operator, via the indicator 34, of a potential collision, or may determine to perform a passive countermeasure 30 or active countermeasure 32.

The controller 26 may also determine whether detection sensors 22 and 24 or other system devices are malfunctioning and indicate to the vehicle operator corresponding information in that respect. When a system device is malfunctioning the controller 26 may disable other system or vehicle devices to prevent a device from performing inappropriately.

The controller 26 in response to object information relative to the vehicle 12, signals one or more of the passive countermeasures 30 and the active countermeasures 32, as needed, so as to prevent a collision or an injury.

The passive countermeasures 30 may include internal airbag control, seatbelt control, knee bolster control, head restraint control, load limiting pedal control, load limiting steering control, pretensioner control, external airbag control, pedestrian protection control, and other passive countermeasures known in the art. Pretensioner control may include control over pyrotechnic and motorized seatbelt pretensioners. Airbag control may include control over front, side, curtain, hood, dash, or other type airbags. Pedestrian protection control may include controlling a deployable vehicle hood, a bumper system, or other pedestrian protective devices.

Active countermeasures 32 may include brake control, throttle control, steering control, suspension control, transmission control, other chassis control systems, and other active countermeasures known in the art.

Indicator 34 is used to signal or indicate a collision-warning signal or an object identification signal in response to the object detection signals. The indicator 34 may include a video system, an audio system, an LED, a light, global positioning system, a heads-up display, a headlight, a taillight, a display system, a telematic system or other indicator. The indicator 34 may supply warning signals, collision-related information, external-warning signals to objects or pedestrians located outside of the vehicle, or other pre and post collision information.

Figure 4:
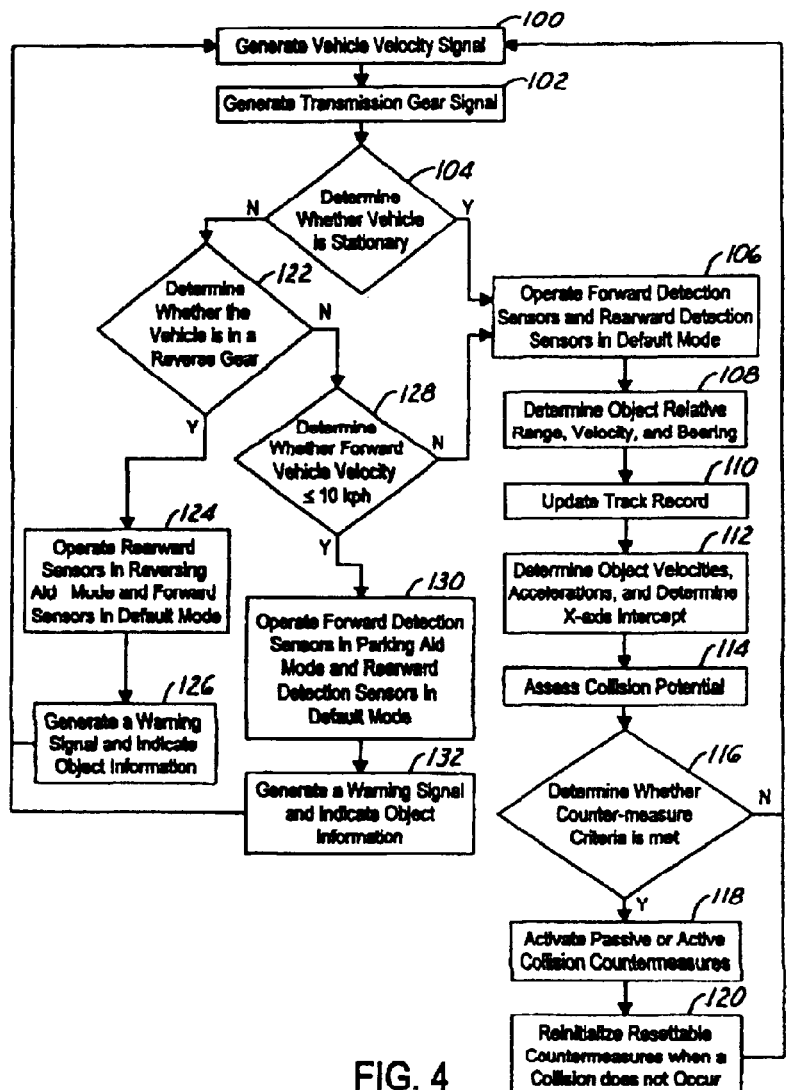
FIG. 4 is a logic flow diagram illustrating a method of detecting objects utilizing the collision warning and countermeasure system in accordance with multiple embodiments of the present invention.

Referring now to FIG. 4, a logic flow diagram illustrating a method of detecting objects within the system 10 in accordance with multiple embodiments of the present invention is shown.

In step 100, the velocity sensor 18 generates a vehicle velocity signal, corresponding to a traveling velocity of the vehicle 12. The velocity signal may be in a magnitude format, thereby having the same value whether the vehicle 12 is traveling in a forward or rearward direction or may provide direction information, via positive or negative indication.

In step 102, the gear sensor 20 generates a gear signal representing a current operating gear. The vehicle 12 may be operating in a forward gear, a rearward gear, or a stationary gear.

In step 104, the controller 26 determines whether the vehicle 12 is stationary in response to the velocity signal, the gear signal, or a combination thereof. When the vehicle 12 is stationary, such that the vehicle traveling velocity is equal to zero the controller 26 operates the detection sensors 22 and 24 in the default mode and proceeds to perform step 106, otherwise step 122 is performed.

In step 106, the controller 26 operates the detection sensors 22 and 24 in the default mode and determines detected object relative range, velocity, and bearing as compared to the host vehicle 12. The object relative range, velocity, and bearing is determined in response to the object detection signals and the host vehicle velocity signal. Steps 106–120 are generally referred to as the default mode.

In step 110, the controller 26 maintains an object track record for detected objects and continuously updates the track record in response to the object detection signals.

In step 112, the controller 26 determines target object velocities $V_x$ and $V_y$ and accelerations $A_x$ and $A_y$ relative to the vehicle from filtered object detection signal data.

In addition, in step 112, an x-axis intercept $X_{tp}$, corresponding with an $x_1$-axis and an $x_2$-axis extending across a front end 111 and a rear end 113, respectively, of the vehicle 12 is determined along with an intercept time $t_p$. The $x_1$-axis and the $x_2$-axis are approximately in-line with vehicle bumpers 115, as shown in FIGS. 2 and 3, The intercept time $t_p$ representing an approximate amount of time until a detected object reaches the x-axis of the host vehicle.

In step 114, the controller 26 assesses the potential for a collision. Probability values for a predicted collision are evaluated to determine when the values are within a predetermined range. For example, when the x-axis intercept is approximately less than half the width of the vehicle 12, there exists a high probability of a collision occurring.

In step 116, current object and vehicle parameters are compared with predetermined countermeasure deployment values to determine whether to perform a passive countermeasure 30 or an active countermeasure 32. When actual object and vehicle parameter values are equal to or exceed predetermined countermeasure deployment values, a countermeasure signal is generated and step 118 is performed, otherwise the controller 26 directly returns to step 100.

In step 118, passive countermeasures 30 or active countermeasures 32 are performed according to determined deployment criteria and in response to the countermeasure signal. For example, when it is determined that an airbag is to be deployed, due to object and vehicle traveling speeds, the controller 26 confirms that an appropriate airbag deployment time has been reached and that there is sufficient time to deploy the airbag. After a predefined time interval, when a collision does not occur, resettable countermeasures are reinitialized in step 120.

For further detailed explanation on x-axis intercept $x_{tp}$ and intercept time $t_p$, U.S. patent application Ser. No. 09/995,503 entitled "Remote Sensing Based Pre-Crash Threat Assessment System", is incorporated herein by reference.

In step 122, the controller 26 determines whether the vehicle 12 is in a reverse gear in response to the gear signal. When the vehicle 12 is in a reverse gear, step 124 is performed, otherwise step 128 is performed.

In step 124, the forward detection sensors 22 receive an operating mode signal from the controller 26 to operate in the default mode, of steps 106–120. The detection sensors 24 receive an operating mode signal from the controller 26 to operate in the reverse parking aid mode or reversing aid mode. The first rearward sensing zone 50 is monitored for objects, as described above.

In step 126, the controller 26 generates a warning signal and indicates to the vehicle operator object information of existing objects within the first rearward sensing zone. In one embodiment of the present invention the controller 26 indicates the warning signal using an audible tone with variable pulse rate corresponding to nearest object range. In another embodiment of the present invention the controller 26 provides a visual indication to the vehicle operator. Following step 126, the controller 26 returns to step 100.

In step 128, the controller 26 determines whether the vehicle traveling velocity is approximately less than or equal to 10 kph. When the vehicle 12 is traveling at a velocity less or equal to 10 kph step 130 is performed, otherwise step 106 is performed and the controller 26 operates the detection sensors 22 and 24 in the default mode.

In step 130, when the vehicle 12 is traveling at a velocity approximately between zero and 10 kph the controller 26 operates the forward detection sensors 22 in the forward parking aid mode and the rearward detection sensors 24 in the default mode.

The forward detection sensors 22 receive an operating mode signal from the controller 26 to operate in the forward parking aid mode and the rearward detection sensors 24 similarly receive an operating mode signal to operate in the default mode. The forward detection sensors 22 scan the first forward sensing zone 40 for objects of interest.

In step 132, the controller 26 generates a warning signal and indicates to the vehicle operator target object information for objects in the first forward sensing zone 40, so that the operator may respond accordingly. Upon completing step 136, the controller returns to step 100.

When the controller 26 indicates object information to the vehicle operator the controller 26 may mute other vehicle audio systems, to provide clear alert potential collision and countermeasure information.

The above-described steps are meant to be an illustrative example, the steps may be performed synchronously or in a different order depending upon the application. Also, the system 10 may operate in one or all of the above-stated operating modes or in any combination thereof.

The present invention provides a collision warning and countermeasure system that utilizes object detection sensors that are capable of operating in multiple modes. The present invention in so doing minimizes the number of components of a vehicle, manufacturing costs of a vehicle, and potentially minimizes weight of a vehicle.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A collision warning and countermeasure system for an automotive vehicle comprising:
    a velocity sensor generating a vehicle velocity signal;
    at least one multi-mode object detection sensor generating at least one object detection signal, said at least one multi-mode object detection sensor operating in a detection mode in response to said vehicle velocity signal; and
    a controller electrically coupled to said velocity sensor and said at least one multi-mode object detection sensor and generating a countermeasure signal in response to said at least one object detection signal;
    wherein at least one of said at least one multi-mode object detection sensor has a plurality of operating modes corresponding to a plurality of detection ranges.

2. A system as in claim 1 wherein said controller generates a detection mode signal in response to said vehicle velocity signal and said at least one multi-mode object detection sensor operates in said detection mode in response to said detection mode signal.

3. A system as in claim 1 wherein said at least one multi-mode object detection sensor operates in a parking aid mode when the vehicle is traveling at a velocity approximately greater than 0 kph and approximately less than or equal to 10 kph.

4. A system as in claim 3 wherein said at least one multi-mode object detection sensor operates in a parking aid mode when the vehicle is traveling in a forward direction.

5. A system as in claim 1 wherein said at least one multi-mode object detection sensor operates in a default mode when the vehicle is stationary or is traveling at a velocity approximately greater than 10 kph.

6. A system as in claim 1 further comprising a transmission gear sensor generating a gear signal, and wherein said at least one multi-mode object detection sensor operates in a parking aid mode in response to said gear signal.

7. A system as in claim 1 wherein said at least one multi-mode object detection sensor comprises:
    a first multi-mode object detection sensor operating in a parking aid mode; and
    a second multi-mode object detection sensor operating in a default mode.

8. A system as in claim 7 wherein said first multi-mode object detection sensor operates in a parking aid mode and said second multi-mode object detection sensor operates in a default mode when the vehicle is in a reverse gear.

9. A system as in claim 1 wherein said controller determines object range, object velocity, and object bearing relative to the vehicle in response to said vehicle velocity signal and said at least one object detection signal operating in a default mode.

10. A system as in claim 1 wherein said controller determines object velocity and object acceleration relative to the vehicle in response to said vehicle velocity signal and said at least one object detection signal operating in a default mode.

11. A system as in claim 1 wherein said controller determines intercept time in response to said vehicle velocity signal and said at least one object detection signal operating in a default mode.

12. A system as in claim 1 wherein said controller generates a countermeasure signal in response to said vehicle velocity signal and said at least one object detection signal operating in default mode.

13. A system as in claim 1 wherein said countermeasure signal comprises at least one of collision warning information, default mode countermeasure information, and parking aid countermeasure information.

14. A system as in claim 1 wherein said at least one multi-mode object detection sensor detects objects up to approximately five meters forward of the vehicle and detects objects in a lateral direction while in a parking aid mode.

15. A system as in claim 1 wherein said at least one multi-mode object detection sensor detects objects up to approximately five meters rearward of the vehicle and detects objects in a lateral direction while in a parking aid mode.

16. A system as in claim 1 wherein said at least one multi-mode object detection sensor detects objects forward and rearward of the vehicle at distances relative to the vehicle of greater than approximately five meters while in a default mode.

17. A collision warning and countermeasure system for an automotive vehicle comprising:
- a velocity sensor generating a vehicle velocity signal;
- a transmission gear sensor generating a gear signal;
- at least one multi-mode object detection sensor generating at least one object detection signal, said at least one multi-mode object detection sensor operating in a detection mode in response to a detection mode signal; and
- a controller electrically coupled to said velocity sensor, said transmission gear sensor and said at least one multi-mode object detection sensor and generating said detection mode signal in response to said vehicle velocity signal and said gear signal and generating a countermeasure signal in response to said at least one object detection signal;
- wherein at least one of said at least one multi-mode object detection sensor operates in a parking aid mode, which refers to a first detection range, when the vehicle is traveling forward at a velocity approximately greater than 0 kph and approximately less than or equal to 10 kph and operates in a default mode, which refers to a second detection range, when the vehicle is stationary or is traveling at a velocity approximately greater than 10 kph.

18. A method of detecting an object for a collision warning and countermeasure system for an automotive vehicle comprising:
- generating a vehicle velocity signal;
- operating at least one of at least one multi-mode object detection sensor in multiple operating modes corresponding to a plurality of detection ranges in response to said vehicle velocity signal; and
- generating at least one object detection signal.

19. A method as in claim 18 further comprising generating a detection mode signal in response to said vehicle velocity signal and operating said at least one multi-mode object detection sensor in said detection mode in response to said detection mode signal.

20. A method as in claim 19 wherein operating at least one multi-mode object detection sensor in a detection mode comprises operating in a parking aid mode when the vehicle is traveling at a velocity approximately between 0–10 kph.

* * * * *